US009535221B2

(12) United States Patent
Bradley (10) Patent No.: US 9,535,221 B2
(45) Date of Patent: Jan. 3, 2017

(54) ULTRAHIGH-DENSITY FIBER DISTRIBUTION COMPONENTS (71) Applicant: OFS Fitel, LLC, Norcross, GA (US)

(72) Inventor: Kelvin B Bradley, Lawrenceville, GA (US)

(73) Assignee: OFS FITEL, LLC, Norcross, GA (US)

( * ) Notice: Subject to any disclaimer, the term of this patent is extended or adjusted under 35 U.S.C. 154(b) by 525 days.

(21) Appl. No.: 13/861,478

(22) Filed: Apr. 12, 2013

(65) Prior Publication Data
US 2014/0205244 A1 Jul. 24, 2014

Related U.S. Application Data (63) Continuation-in-part of application No. 13/049,780, filed on Mar. 16, 2011, now Pat. No. 8,801,301, and a continuation-in-part of application No. 13/049,794, filed on Mar. 16, 2011, now Pat. No. 9,069,143.

(60) Provisional application No. 61/659,009, filed on Jun. 13, 2012, provisional application No. 61/798,231, filed on Mar. 15, 2013.

(51) Int. Cl.
G02B 6/44 (2006.01)
G02B 6/38 (2006.01)
G02B 6/02 (2006.01)

(52) U.S. Cl.
CPC ......... *G02B 6/3869* (2013.01); *G02B 6/02042* (2013.01); *G02B 6/3885* (2013.01); *G02B 6/3851* (2013.01); *G02B 6/3893* (2013.01); *G02B 6/4403* (2013.01)

(58) Field of Classification Search
None
See application file for complete search history.

(56) References Cited

U.S. PATENT DOCUMENTS 4,708,433 A * 11/1987 Kakii ................ B29C 45/14467
385/54
4,832,720 A * 5/1989 Watanabe ......... C03B 37/01222
65/409
5,353,365 A * 10/1994 Dumas .................. C03B 37/028
385/102

(Continued)

FOREIGN PATENT DOCUMENTS

JP 10-104443 * 4/1998
JP 2010-286548 * 12/2010

*Primary Examiner* — Mike Stahl
(74) *Attorney, Agent, or Firm* — Jacobs & Kim LLP (57) ABSTRACT A pre-terminated distribution module is provided with a set of multicore fiber (MCF) connector adapters at its front end and a set of multifiber MCF connector adapters at a second end. The MCF connector adapters and multifiber MCF connector adapters are connected to each other within the module housing by means of an MCF fanout. The MCF connector adapters are configured to provide core-aligned connection for MCF jumper cables that are plugged into the front end of the module. The MCF jumper cables are configured to provide connectivity to an array of optical devices. The multifiber connector adapters are configured to provide core-aligned connectivity for multifiber MCF cables that are plugged into the back end of the module. The multifiber cables are configured to provide connectivity between the module and a trunk (backbone) cable. Further described are pre-terminated trunk (backbone) cables and pre-terminated fiber optic jumper cables (i.e., patchcords).

11 Claims, 7 Drawing Sheets

(56) References Cited

U.S. PATENT DOCUMENTS

| | | | | |
|---|---|---|---|---|
| 6,154,594 A * | 11/2000 | Fiacco | C03B 37/01222 | 385/126 |
| 2002/0071644 A1* | 6/2002 | Nakajima | H01B 11/22 | 385/101 |
| 2003/0044141 A1* | 3/2003 | Melton | G02B 6/3608 | 385/114 |
| 2003/0161584 A1* | 8/2003 | Ohtsuka | G02B 6/3885 | 385/60 |
| 2003/0190130 A1* | 10/2003 | Welker | B29D 11/00721 | 385/126 |
| 2004/0109646 A1* | 6/2004 | Anderson | G02B 6/3885 | 385/71 |
| 2010/0195965 A1* | 8/2010 | Sasaoka | G02B 6/02042 | 385/126 |
| 2011/0176776 A1* | 7/2011 | Imamura | G02B 6/02042 | 385/59 |
| 2011/0274398 A1* | 11/2011 | Fini | G02B 6/0365 | 385/124 |
| 2012/0141074 A1* | 6/2012 | Sabo | G02B 6/3885 | 385/78 |
| 2012/0251045 A1* | 10/2012 | Budd | G02B 13/26 | 385/33 |
| 2012/0321253 A1* | 12/2012 | Shimakawa | B23P 11/00 | 385/71 |
| 2013/0044978 A1* | 2/2013 | DeDobbelaere | G02B 6/3853 | 385/33 |
| 2013/0136404 A1* | 5/2013 | Feuer | G02B 6/02042 | 385/124 |
| 2013/0251320 A1* | 9/2013 | Hayashi | G02B 6/02042 | 385/100 |
| 2013/0322835 A1* | 12/2013 | Butler | G02B 6/02042 | 385/114 |
| 2014/0219613 A1* | 8/2014 | Nielson | G02B 6/3885 | 385/78 |

* cited by examiner

Channel Densities Using LC Connectors

|  | # of Modules | Single-Core Fiber | Multicore (6-core) Fiber |
|---|---|---|---|
| 19" Horizontal Panel | 3 | 72/U | 432/U |
| 19" Horizontal Panel | 4 | 96/U | 576/U |
| 1U Shelf | 0 (adapters only) | 96/U | 576/U |
| 4U Shelf | 12 | 72/U | 432/U |

Channel Densities Using SC Connectors

|  | # of Modules | Single-Core Fiber | Multicore (6-core) Fiber |
|---|---|---|---|
| 19" Horizontal Panel | 3 | 36/U | 216/U |
| 19" Horizontal Panel | 4 | 48/U | 288/U |
| 1U Shelf | 0 (adapters only) | 48/U | 288/U |
| 4U Shelf | 12 | 36/U | 216/U |

FIG. 12B

ULTRAHIGH-DENSITY FIBER DISTRIBUTION COMPONENTS

CROSS REFERENCE TO RELATED APPLICATIONS

The present application claims the priority benefit of the following:
U.S. Prov. Pat. App. Ser. No. 61/659,009, filed on Jun. 13, 2012; and
U.S. Prov. Pat. App. Ser. No. 61/798,231, filed on Mar. 15, 2013.

The present application is a continuation-in-part of the following patent applications:
"Simplex Connectors For Multicore Optical Fiber Cables," U.S. patent application Ser. No. 13/049,780, filed on Mar. 16, 2011, published on Sep. 22, 2011, as U.S. Pat. App. Pub. No. 2011/0229085; and
"Multifiber Connectors For Multicore Optical Fiber Cables," U.S. patent application Ser. No. 13/049,794, filed on Mar. 16, 2011, published on Sep. 22, 2011, as U.S. Pat. App. Pub. No. 2011/0229086,
both of which claim the priority benefit of U.S. Prov. Pat. App. Ser. No. 61/314,165, filed on Mar. 16, 2010.

All of the above applications are owned by the assignee of the present application, and are incorporated herein by reference in their entirety.

INCORPORATION BY REFERENCE

The following patent applications, both owned by the assignee of the present invention, are incorporated herein by reference in their entirety:
"Multicore Fibers and Associated Structures and Techniques," U.S. patent application Ser. No. 13/045,064, filed on Mar. 10, 2011, published on Nov. 10, 2011, as U.S. Pat. App. Pub. No. 2011/0274398; and
"Multicore Fiber Transmission Systems and Methods," U.S. patent application Ser. No. 13/044,859, filed on Mar. 10, 2011, published on Nov. 10, 2011, as U.S. Pat. App. Pub. No. 2011/0274435.

BACKGROUND OF THE INVENTION

Field of the Invention

The present invention relates generally to the field of fiber optics, and in particular to applications for multicore optical fiber cables and connectors.

Background Art

The growing need for high-speed applications in the structured cabling market continues to spawn interest in optical fiber distribution systems. Legacy copper patching systems continue to be replaced by fiber-optic systems, as bandwidth demands increase. In data centers, central offices, and other structured cabling applications, fiber-optic patch panels are being widely deployed to facilitate connections between switches, servers, storage devices and office space.

In structured cabling systems, it is very desirable to provide fiber distribution frames with increased connector-port density. As used herein, the term "density" refers to the number of locations, per unit volume or unit area, for providing connections on a distribution frame.

A distribution frame is typically configured to include multiple shelves of a specified size. The term "rack unit" (abbreviated simply as "U") refers to a height of 1.75 inches. Thus, a shelf height of 7 inches corresponds to a rack unit height of 4U. The density of a shelf can thus be quantified as the number of optical paths, or channels, per rack unit (e.g., 36 channels/U).

In order to reduce the effective area that a patching system utilizes in a facility, suppliers of fiber optic cables and connectivity have taken steps to reduce the size of the fiber optic connectors. For instance, LC connectors, which are 50% smaller than SC connectors, have become prevalent in the market place. Simply converting to LC connectors, from SC, immediately provides a two-fold increase in patching density.

Pre-terminated modular cassette patching products are available for use in structured cabling applications. A typical cassette provides a plurality of simplex connector adapters (i.e., sockets) at its front end and one or more multifiber connector adapters (e.g., MPO-type) at its back end. The front and back adapters are connected to each other within the cassette housing, by fiber optic fanouts.

These cassette systems allow a user to create a passive network link with minimal fiber optic expertise. An installer loads a cassette onto a termination shelf within a vertical rack cabinet. A multifiber-MPO-terminated trunk (backbone) cable is then plugged into an adapter at the rear of the cassette. An optical transceiver can then be connected into the network by plugging one end of a patchcord into transceiver socket, and plugging the other end of the patchcord into an adapter at the front of the cassette. An optical link can be completed by performing the same steps at the other end of the trunk cable.

Modular cassettes are commonly installed in a side-by-side configuration on a termination shelf. If a 1U panel has a terminal shelf configured to receive three side-by-side modular cassettes, each housing 24 LC connectors, the port density is 72 channels/U (i.e., 24×3).

A significant improvement in density has been achieved by increasing the number of conventional pre-terminated modules that can be installed into a panel or shelf. For example, by using a 24-port LC module with low-profile latches, it is possible to install four modules into a 19" horizontal 1U panel, instead of only three. The channel density thus increases from 72 channels/U (i.e., 24×3) to 96 channels/U (i.e., 24×4), a 33⅓ percent increase.

Although the increases in density achieved by increasing the number of modules is noteworthy, it does not, in itself, fully address the rising demand for increased densities, lower power consumption, faster transmission rates, and the like. Jamming more components into a confined space, reducing connector size, and other such approaches make assembly, installation and handling more challenging. A solution is needed that does not adversely affect fiber management.

SUMMARY OF THE INVENTION

The above issues and others are addressed by the present invention, aspects of which are directed to fiber distribution components that achieve ultrahigh densities through the use of multicore fiber (MCF) technology. These components provide core-aligned connectivity between arrays of optical transceivers and respective MCF cores in a multi-MCF trunk cable.

A pre-terminated distribution module according to an aspect of the invention comprises a set of MCF connector adapters at its front end and a set of multifiber MCF connector adapters at a second end. The MCF connector adapters and multifiber connector adapters are connected to each other within the module housing by means of an MCF fanout.

The MCF connector adapters are configured to provide core-aligned connection for MCF jumper cables that are plugged into the front end of the module. The MCF jumper cables are configured to provide connectivity to an array of optical devices. The multifiber MCF connector adapters are configured to provide core-aligned connectivity for multifiber MCF cables that are plugged into the back end of the module. The multifiber cables are configured to provide connectivity between the module and a trunk (backbone) cable.

Further aspects of the invention are directed to pre-terminated trunk (backbone) cables and pre-terminated fiber optic jumper cables (i.e., patchcords).

DETAILED DESCRIPTION

The present invention is directed to fiber distribution components, in which multicore fibers (MCFs) and multicore connectivity are utilized to significantly increase channel densities. The structures and techniques described herein overcome the above-described limitations of conventional connectivity components with a minimal impact on installation, handling, and other aspects of fiber management.

Aspects of the invention include the following:

1. Pre-Terminated Distribution Modules: A pre-terminated distribution module (e.g., a modular cassette or a termination shelf) according to an aspect of the invention comprises one or more MCF multifiber-to-single-fiber fanouts contained within the module housing that provide core-aligned connectivity between MCF connector adapters (e.g., LC adapters) at the front end of the module and multifiber adapters (e.g., MPO multifiber adapters) at the rear end of the module.

2. Pre-Terminated Trunk (Backbone) Cables: Pre-terminated trunk (backbone) cables according to an aspect of the invention comprise a plurality of multicore fibers that are provided with connectors that are configured to plug into adapters at the back end of a pre-terminated distribution module. The connectors and adapters are configured to provide core-aligned connectivity between a plurality of multicore trunk fibers and a respective plurality of multicore fanout fibers within the distribution module.

3. Pre-Terminated Jumper Cables: Pre-terminated fiber optic jumper cables (i.e., patchcords) according to an aspect of the invention comprise one or more short lengths of MCF with jumper connectors at both ends. The jumper connector at a first end of the patchcord is configured to plug into a VCSEL array, active device, transceiver, router, or the like. The jumper connector at the other end of the patchcord is configured to plug into the front of a pre-terminated distribution module.

4. Pre-Terminated Shelf: A pre-terminated distribution shelf according to an aspect of the invention provides a housing for trunk-to-jumper fanouts. The pre-terminated shelf is provided with jumper connector adapters on a front panel and multifiber connector adapters at its rear. Alternatively, a pre-terminated distribution shelf could be configured to allow a multifiber multicore trunk cable to be connected directly to a multifiber jumper cable at the front panel (i.e., no fanout is used). In this case, the opposite end of the multifiber jumper cable (i.e., patchcord) would be connected directly to the optical devices (VCSELs, etc.)

Unless specifically indicated otherwise, or as required by context, the terminology used herein is intended to reflect current usage in the fiber optic industry.

As used herein, the term "distribution module" generically refers to a pre-terminated enclosure for an optical fiber fanout, and includes modular cassettes, termination shelves, and the like.

The terms "jumper," "jumper cable," and "patchcord" generically refer to a fiber optic cable that is used to connect optical devices into a fiber optic network. The components described by these terms include simplex cables and connectors (such as, for example, LC-type or SC-type connectors), duplex cables and connectors, and the like. Typically, a fiber optic jumper cable has connectors mounted to both ends, usually of the same type. However, it will be appreciated from the following discussion that aspects of the present invention can be practiced with other types of connector configurations.

The term "core-aligned" refers to a physical, endface-to-endface connection between a first MCF and a second MCF in which individual cores in the first MCF are lined up with individual cores in the second MCF, such that parallel transmission channels are preserved across the first and second MCFs, with an acceptably low insertion loss.

The fiber distribution components described herein employ multicore fiber (MCF) in order to increase patching densities. Aspects of the present invention are described herein with respect to an MCF of the type described in the following U.S. Pat. App.s, which are owned by the assignee of the present application, and which are incorporated herein by reference in their entirety:

"Simplex Connectors For Multicore Optical Fiber Cables," U.S. patent application Ser. No. 13/049,780, filed on Mar. 16, 2011, published on Sep. 22, 2011, as U.S. Pat. App. Pub. No. 2001/0229085;

"Multifiber Connectors For Multicore Optical Fiber Cables," U.S. patent application Ser. No. 13/049,794, filed on Mar. 16, 2011, published on Sep. 22, 2011, as U.S. Pat. App. Pub. No. 2001/0229086;

"Multicore Fibers and Associated Structures and Techniques," U.S. patent application Ser. No. 13/045,064, filed on Mar. 10, 2011, published on Nov. 10, 2011, as U.S. Pat. App. Pub. No. 2011/0274398; and "Multicore Fiber Transmission Systems and Methods," U.S. patent application Ser. No. 13/044,859, filed on Mar. 10, 2011, published on Nov. 10, 2011, as U.S. Pat. App. Pub. No. 2011/0274435.

As described in U.S. patent application Ser. No. 13/044,859, an MCF can be butt-coupled with a two-dimensional array of optical devices, such as vertical cavity surface emitting laser diodes (VCSELs), PiN photodetectors, or the like, to facilitate simultaneous, parallel transmissions over several cores (or channels) within the MCF.

Figure 1A:
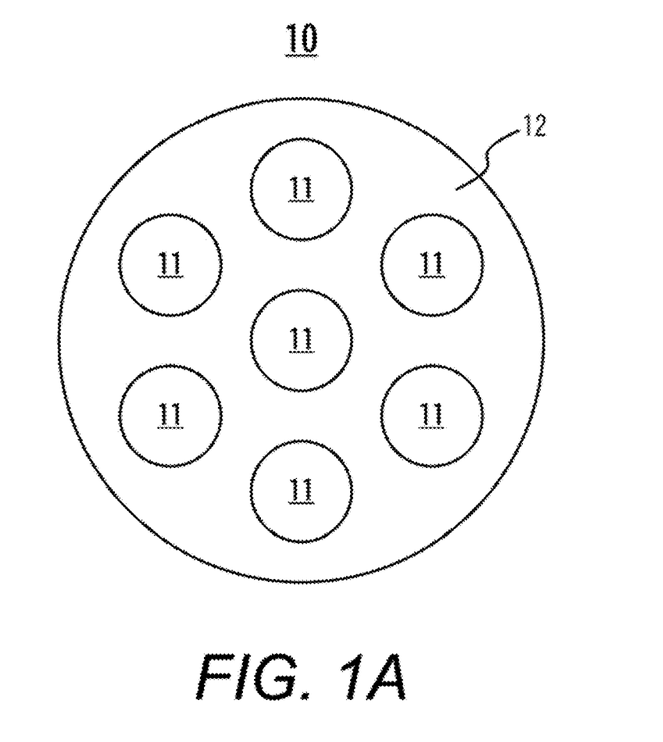
FIGS. 1A and 1B show, respectively, endface and perspective views of a multimode multicore fiber that is used in practices of the present invention.
Figure 1B:
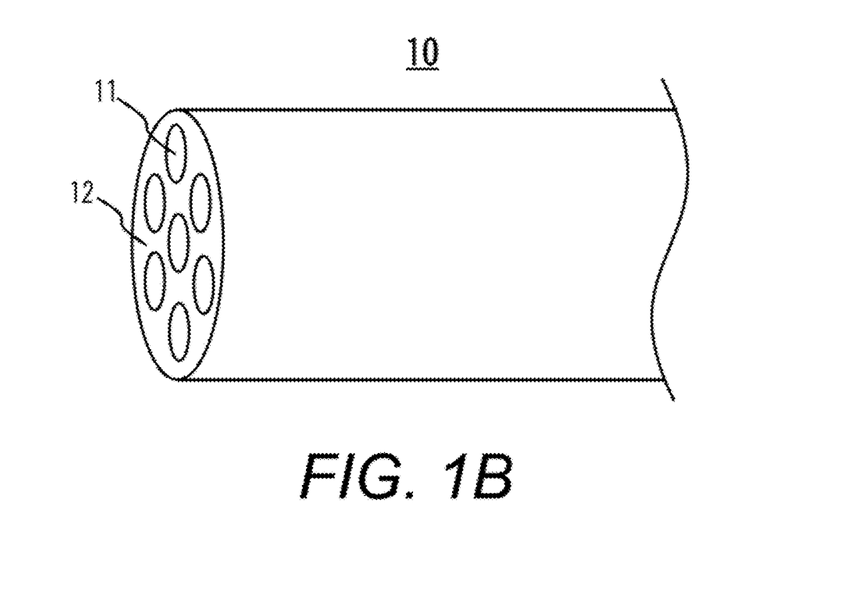

FIGS. 1A and 1B show, respectively, endface and perspective views of a multimode MCF 10, described in detail in U.S. patent application Ser. No. 13/045,064. Using MCFs, instead of single-core fibers, increases patching densities without jeopardizing optical performance or introducing fiber management issues. MCF 10 comprises seven graded-index cores 11, produced from seven graded-index Laser-Wave fiber core rods using a stack-and-draw process. The cores are arranged in a hexagonal array including a center core and six outer cores that extend through a shared cladding 12. The diameter of each of the cores is ~27 μm, and the core pitch is ~37 μm. The cladding diameter is 125 μm and the acrylate dual coating layer (not shown) is 250 μm. These diameters are compatible with conventional optical connectivity products. It is noted that other cladding diameters and geometrical configurations are also feasible. It is also noted that aspects of the invention described herein may also be practiced with multicore fibers having different types of cores, such as step-index or single-mode cores.

Figures 2A, 2B:
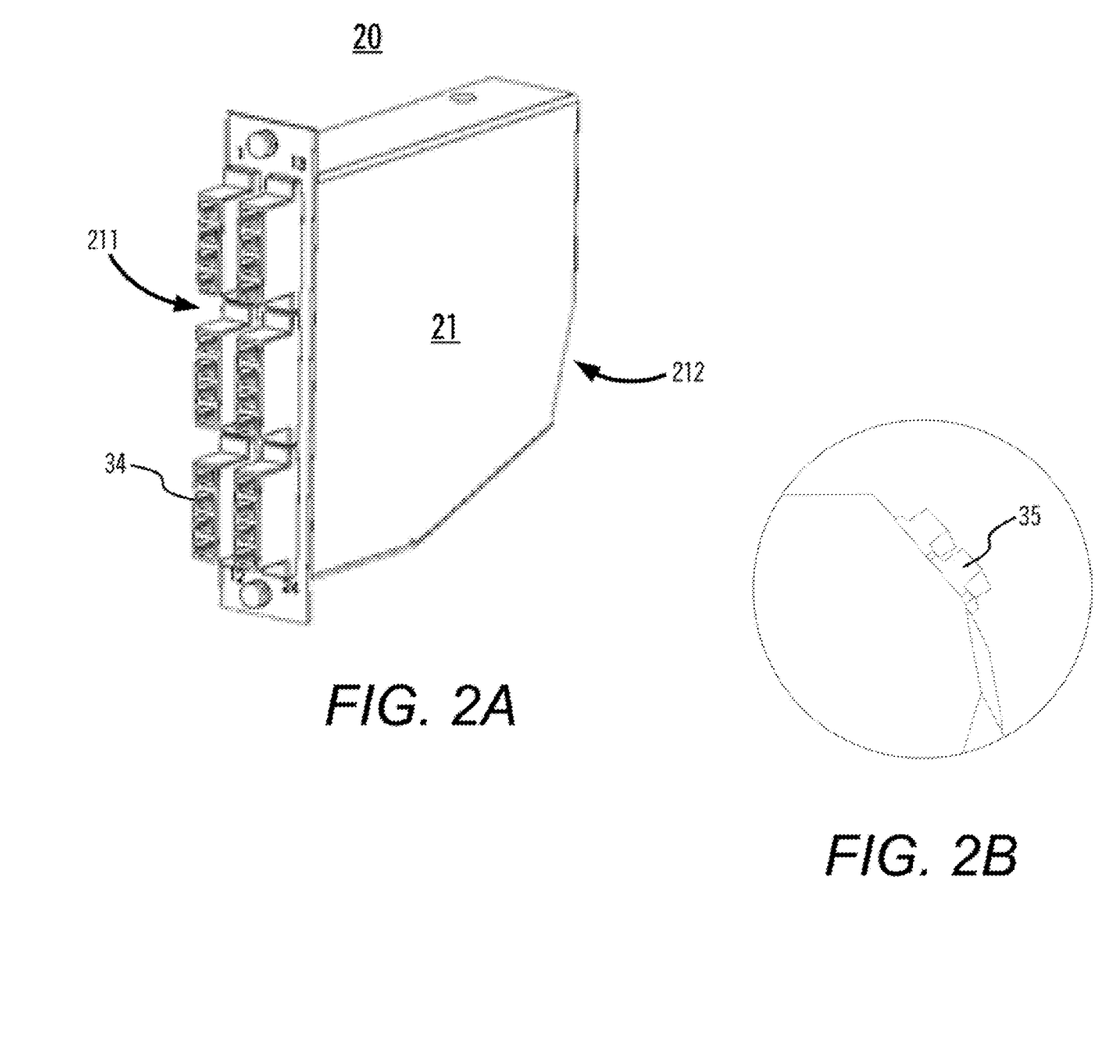
FIGS. 2A and 2B show a modular cassette according to an aspect of the invention that is configured to provide core-aligned connectivity between multicore fiber optic jumper cables plugged into its front end and a multicore fiber optic trunk cables plugged into its back end.

In accordance with an aspect of the invention, MCFs can be used to construct ultrahigh-density, pre-terminated fiber distribution modules. FIG. 2 shows a perspective view of a modular cassette 20 according to an aspect of the invention that is configured to provide core-aligned connectivity between MCF jumper cables plugged into its front end and MCF trunk cables plugged into its back end.

Cassette 20 comprises a housing 21 with a first end 211 that is accessible from the front panel of an optical fiber rack-mount, and a second end 212 that faces the interior of the rack-mount. Housing 21 is configured to be loaded into the rack-mount next to other like-shaped cassettes.

Figure 3:
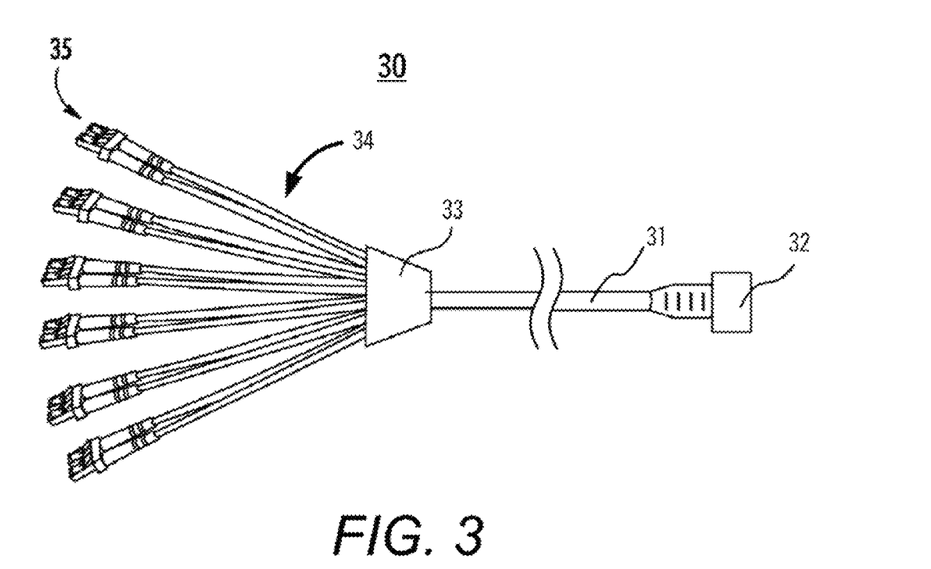
FIG. 3 shows a plan view of an exemplary multicore fiber fanout according to an aspect of the invention.

FIG. 3 shows a plan view of an exemplary MCF fanout 30 according to an aspect of the invention. Fanout 30 comprises a length of a multifiber MCF cable 31 containing a plurality of individual MCFs. The "trunk" end of cable 31 is terminated with a multicore multifiber connector 32 (e.g., an MPO connector). The other end of cable 31 is terminated with a transition 33 that is used to separate and group the individual fibers 34 according to their respective jumper assignments. The individual MCFs are terminated at respective connectors 35 (e.g., LC connectors). It is noted that if other types of connectors are employed, the fanout is modified accordingly.

Returning to FIG. 2, it will be seen that the fanout single-fiber leads 34 are configured to be accessible from the front end of the cassette 20. FIG. 2A shows a close-up view of a portion of the rear of cassette 20. As shown in FIG. 2A, the fanout multifiber connectors are configured to be accessible from the rear end of the cassette 20.

Figure 4:
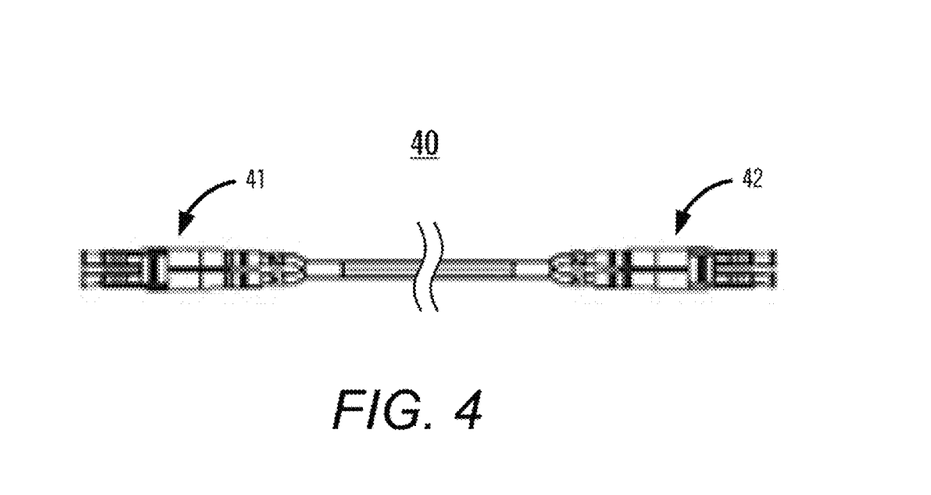
FIG. 4 shows a plan view of an multicore fiber duplex jumper cable in accordance with an aspect of the invention.

FIG. 4 shows a plan view of an MCF duplex jumper cable 40 in accordance with an aspect of the invention. The invention is terminated at a first end with a connector 41 configured to plug into the front of cassette 20, and is terminated at a second end with a connector 42 configured to plug into an assembly that provides a core-aligned physical connection to an array of optical devices, or to another MCF. In the depicted example, connectors 41 and 42 are of the same type.

Figure 5:
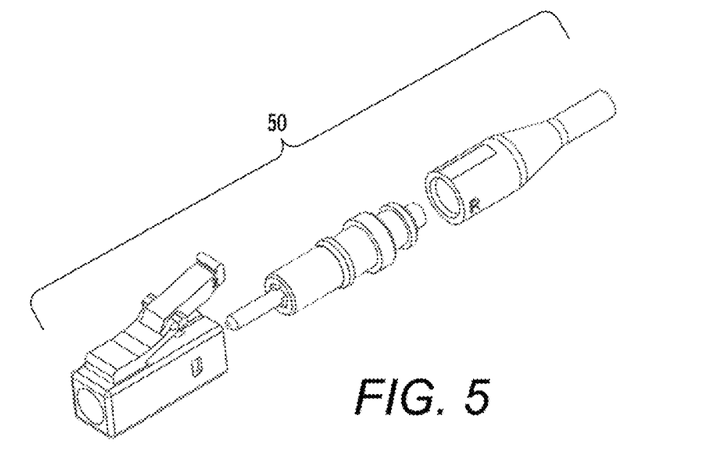
FIG. 5 shows an exploded perspective view of a core-aligned simplex connector (LC-type) that is used in a practice of the present invention.

Connector 50 shown in FIG. 5 is described in detail in U.S. patent application Ser. No. 13/049,780, which is incorporated herein by reference in its entirety. As discussed therein, connector 50 is provided with means for precisely adjusting the rotational orientation of an MCF as part of the connectorization process.

Figure 6:
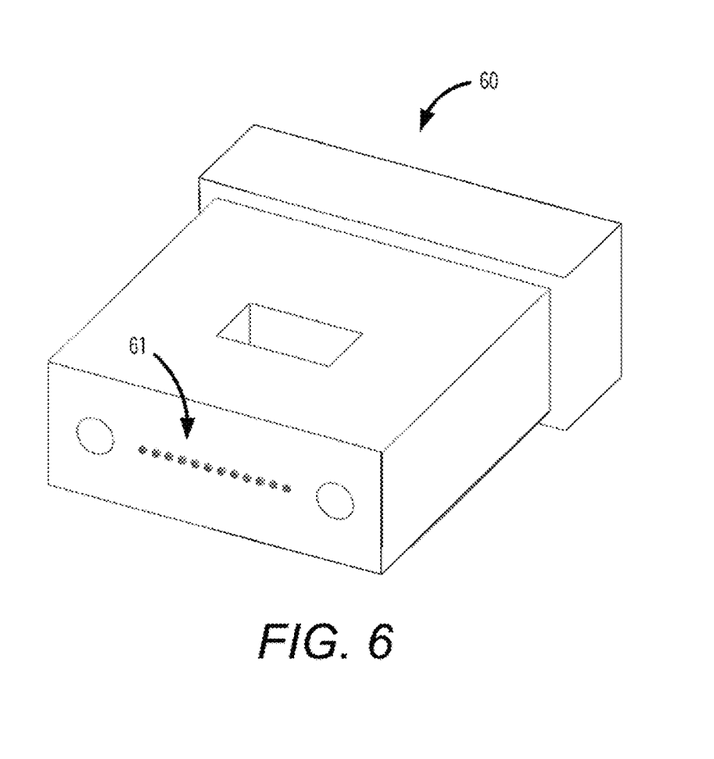
FIG. 6 shows a perspective view of a multicore, multifiber MT ferrule that is used to provide core-aligned multifiber connectivity in a practice of the present invention.

FIG. 6 shows a perspective view of a multicore, multifiber MT ferrule 60 that is suitable for providing core-aligned multifiber connectivity in conjunction with the present invention. Ferrule 60 is configured to connectorize 12 MCFs, within an MPO-type connector and is described in detail in U.S. patent application Ser. No. 13/049,794, which is incorporated herein by reference in its entirety. The MPO-type multicore multifiber connector, mounted to the first cable end, is configured to plug into a respective multifiber adapter mounted to a distribution module so as to provide core-aligned connectivity between the plurality of trunk multicore fibers and a respective plurality of multicore fibers in a multicore fanout housed within the distribution module. Ferrule 60 comprises a ferrule body having a plurality of guide holes therethrough for guiding a respective plurality of trunk multicore fibers. The guide holes are positioned in alignment with respective multicore fanout fibers terminated within an MPO-type connector mated to a respective multifiber adapter mounted to a distribution module, such as module 20 shown in FIG. 2. It will be appreciated that other types of multifiber ferrules can be used in conjunction with aspects of the present invention.

Figure 7A:
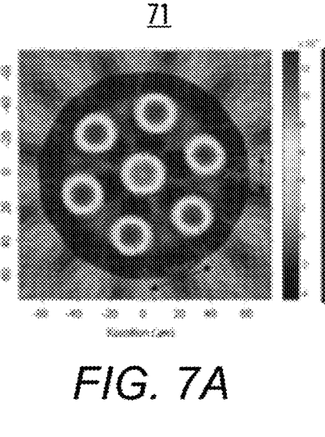
FIG. 7A shows a tomographic refractive index profile of the multicore fiber depicted in FIG. 1.
Figure 7B:
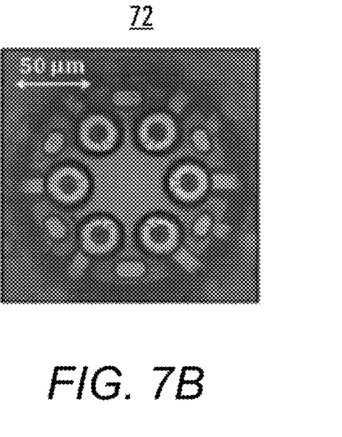
FIG. 7B shows an image of a hexagonally arranged VCSEL array that can be used to interface with the outer six cores of the multicore fiber illustrated in FIG. 7A.

Other aspects of MCF technology can be used in conjunction with the present invention. For example, FIG. 7A shows a tomographic refractive index profile 71 of the MCF 10 illustrated in FIG. 1, discussed above, and FIG. 7B shows an image of a hexagonally arranged VCSEL array 72 that can be used to interface with the outer six cores of the MCF 10. MCF 10 and VCSEL array 72 are described in detail in U.S. patent application Ser. No. 13/045,064, and U.S. patent application Ser. No. 13/044,859.

Figure 8:
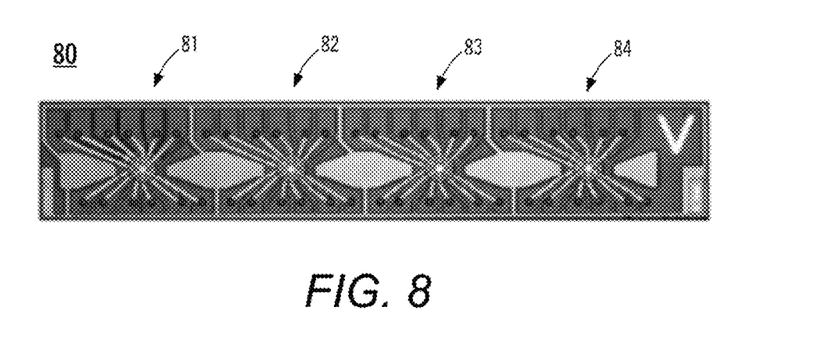
FIG. 8 shows a plan view of a printed circuit board containing four VCSEL arrays arranged in a side-by-side configuration, each array comprising six VCSELs.

FIG. 8 shows a plan view of a printed circuit board (PCB) 80 containing four VCSEL arrays 81-84, arranged in a side-by-side configuration, each array comprising six VCSELs. The depicted VCSEL arrays are designed to transmit through the six outer cores of a 7-core multicore fiber.

Thus, in a further practice of the invention, a matrix of twelve 6-VCSEL arrays can be produced to interface with the multicore, 12-fiber MT ferrule, shown in FIG. 6. A single 6-VCSEL array can be used to interface with a jumper cable terminated with a simplex connector, such as connector 50 shown in FIG. 5. Other core counts and VCSEL configurations are possible (e.g., 2×2, etc.).

By combining a multicore, multifiber MT ferrule, containing appropriately aligned MCFs, with a suitably configured 2-dimensional VCSEL array, of the type shown in FIG. 8, it is possible to realize parallel transmission down 72 channels in the same space required for 12-channel transmission with conventional single-core fibers. Since MT ferrules are available with fewer holes, terminated variants with fewer fibers could also be produced. In addition, multicore fibers with any number of cores, and MT ferrules with any number of holes could be produced. Thus, multi-fiber connectors with various channel counts are possible.

As previously mentioned, notable improvements in density have been achieved by simply increasing the number of conventional pre-terminated modules installed in a panel or shelf. For instance, by placing 4 modules, instead of three, in a 19" horizontal 1U panel, the channel density (when using LC connectors), goes from 72 channels/U (i.e., 24×3) to 96 channels/U (i.e. 24×4). However, by employing the MCF and MCF connectivity in the pre-terminated modules, the channel density achievable in a horizontal 19" panel increases to 576 channels/U, a six-fold increase.

Figure 9:
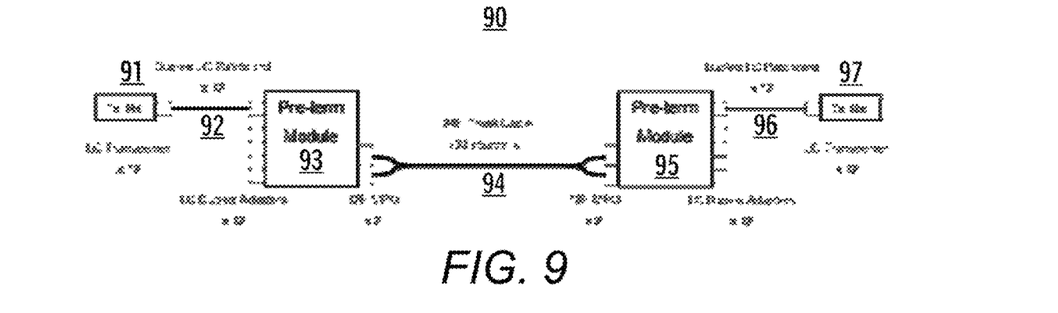
FIG. 9 is a diagram of an exemplary optical link containing multicore fibers and multicore fiber connectivity.

FIG. 9 is a diagram of an exemplary optical link 90 employing MCF and MCF connectivity. A first array of transmitting and receiving devices 91 is connected via multicore patchcord 92 to a first pre-terminated module 93 in accordance with the present invention. Module 93 is connected via trunk cable 94 to a second pre-terminated module 95, which in turn is connected via multicore patchcord 96 to a second array of transmitting and receiving devices 97. As discussed above, these connections are all core-aligned. Thus, it is possible to achieve low-loss connectivity between a first individual transmitting or receiving device 91 and a remotely located second individual transmitting or receiving device 97.

Figure 10:
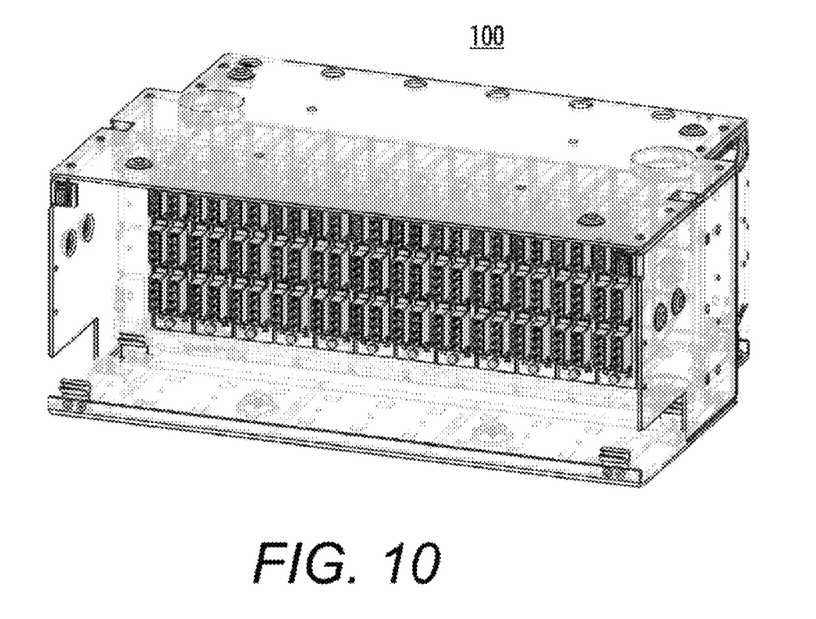
FIG. 10 shows a perspective view of a termination shelf according to a further aspect of the invention.

Significant channel density increases are also realized when pre-terminated MCF modules are employed in termination shelves, such as termination shelf 100, shown in FIG. 10. A typical 4U LC shelf, employing single-core fibers, accommodates 288 channels, or a channel density of 72 channels/U. However, using MCF and MCF connectivity, the channel density would be six times greater, or 432 channels/U, without a degradation in optical performance. Also, there would be no adverse effect on fiber management, since a reduction in connector size, which typically makes assembly, installation, and handling more challenging, is not required. In the previous examples, LC connectors were referenced, but significant density improvements can be made with other simplex connector types (i.e. SC, FC, etc.), when MCF is employed. It should also be understood that modules with various port densities and shelves with alternate configurations (i.e. 2U, 6U, etc.) are covered in this specification.

Figure 11:
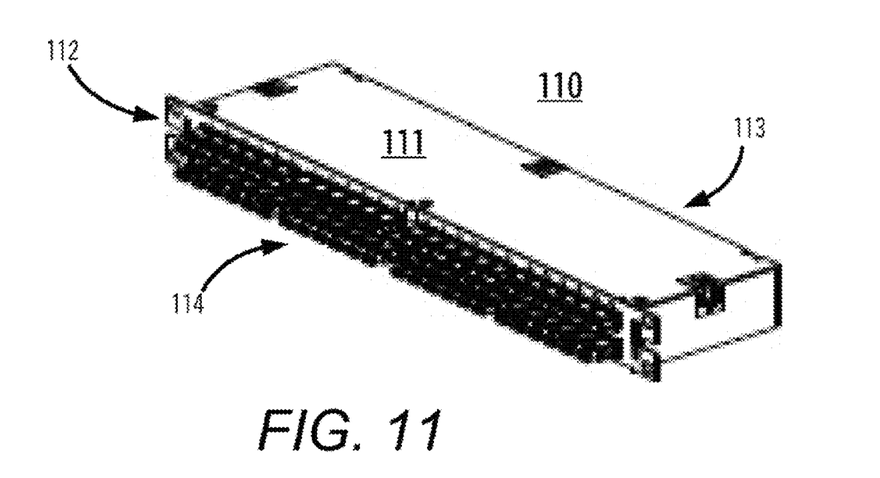
FIG. 11 shows a perspective view of an LC-adapter-only panel according to a further aspect of the invention.

Further worth mentioning are conventional pre-terminated 1U shelves, which do not utilize modular cassettes, but instead use only the connector adapters densely packed onto the 1U panel. For instance, a 1U LC adapter-only panel, like panel 110 shown in FIG. 11, provides 96 channels/U. If MCF and MCF connectivity are used in this scenario, the density increases to 576 channels/U.

As mentioned above, the term "distribution module" is used herein to generically refer to enclosures for housing pre-terminated multicore fiber fanouts, and includes modular cassettes, such as cassette 20 in FIG. 2, and panel 110 in FIG. 11. Like cassette 20, panel 110 comprises a housing 111 with a front end 112 and a back end 113. A plurality of simplex jumper cable connectors 114 are mounted to the panel's front end 112. Mounted to the back end of the panel are one or more trunk cable connectors (not shown).

Figure 12A:
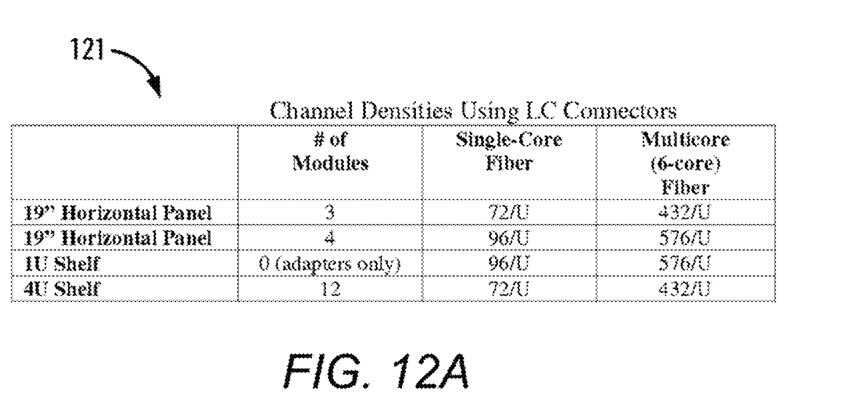
FIGS. 12A and 12B show a pair of tables that summarize the density increases expected using multicore fiber connectivity, in various distribution configurations.
Figure 12B:
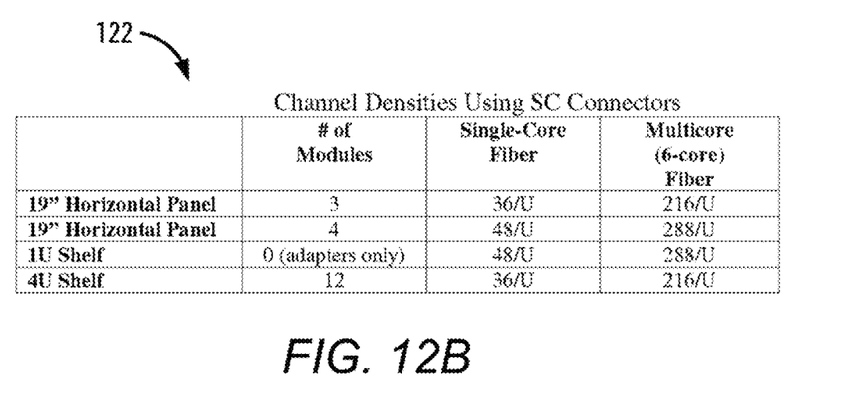

FIGS. 12A and 12B are a pair of tables 121, 122 that summarize the density increases expected using MCF connectivity, in various distribution configurations. Table 121 sets forth the channel densities that are attainable using LC connectors. Table 122 sets forth the channel densities that are available using LC connectors.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. An ultrahigh-density fiber distribution system, comprising:
a distribution module for housing a plurality of multicore fibers in a multicore fanout, wherein the multicore fanout has a trunk end that is terminated within a multifiber connector that is mated to a multifiber adapter at a trunk end of the distribution module; and
a pre-terminated trunk cable, comprising:
a plurality of trunk multicore fibers extending between a first trunk cable end and a second trunk cable end; and
a multicore multifiber connector, mounted to the first trunk cable end, that is configured to plug into the multifiber adapter at the trunk end of the distribution module so as to provide core-aligned connectivity between individual multicore fibers in the plurality of trunk multicore fibers and respective individual multicore fibers in the plurality of multicore fibers in the multicore fanout housed within the distribution module.

2. The ultrahigh-density fiber distribution system of claim 1,
wherein the multicore multifiber connector mounted to the first trunk cable end comprises a ferrule body having a plurality of guide holes therein for guiding a respective plurality of trunk multicore fibers, and wherein each of the plurality of guide holes is positioned in alignment with a respective individual multicore fiber at the trunk end of the multicore fanout.

3. The ultrahigh-density fiber distribution system of claim 2,
wherein the multicore multifiber connector mounted to the first trunk cable end is an MPO-type connector, comprising an MT ferrule.

4. The ultrahigh-density fiber distribution system of claim 1,
further comprising a second multicore multifiber connector mounted to the second trunk cable end.

5. An ultrahigh-density fiber distribution system, comprising:
a distribution module for housing a plurality of multicore fibers in a multicore fanout, wherein the multicore fanout has a trunk end for connection to a trunk cable at a trunk end of the distribution module and a second end at which individual fibers are separated and grouped according to their respective jumper assignments and terminated at respective connectors that are mated to one or more respective adapters at a second end of the distribution module; and
a pre-terminated fiber optic jumper cable, comprising:
a length of a multicore fiber cable having a first end and a second end; and
respective first and second multicore fiber jumper connectors mounted to the first and second cable ends, wherein the first multicore fiber jumper connector is configured to plug into a respective adapter at the second end of the distribution module so as to provide core-aligned connectivity with an individual multicore fiber at the second end of the multicore fanout fiber housed within the distribution module, and wherein the second multicore fiber jumper connector is configured to plug into a respective adapter so as to provide core-aligned connectivity with a respective plurality of optical devices.

6. The ultrahigh-density fiber distribution system of claim 5, wherein the pre-terminated fiber optic jumper cable comprises a length of multicore fiber cable containing a single multicore fiber, and wherein the first and second multicore fiber jumper connectors are configured as simplex connectors.

7. The ultrahigh-density fiber distribution system of claim 5, wherein the pre-terminated fiber optic jumper cable comprises a length of multicore fiber cable comprises a duplex cable containing two multicore fibers, and wherein the first and second multicore fiber jumper connectors are configured as duplex connectors.

8. The ultrahigh-density fiber distribution system of claim 5, wherein the second multicore fiber jumper connector of the pre-terminated fiber optic jumper cable is configured to plug into a respective adapter so as to provide core-aligned butt- coupling between exposed cores at an endface at the second end of the multicore fiber cable and the respective plurality of optical devices.

9. The ultrahigh-density fiber distribution system of claim 8, wherein the respective plurality of optical devices comprises a two-dimensional array of vertical cavity surface emitting laser elements.

10. The ultrahigh-density fiber distribution system of claim 8, wherein the second multicore fiber jumper connector of the pre-terminated fiber optic jumper cable is configured to plug into a respective adapter so as to provide core-aligned connectivity with a plurality of optical devices comprising a two-dimensional array of silicon photonic emitter elements.

11. The ultrahigh-density fiber distribution system of claim 8, wherein the respective plurality of optical devices comprises a two-dimensional array of PiN photodetectors.

* * * * *